United States Patent [19]
Cowe

[11] Patent Number: 5,556,064
[45] Date of Patent: Sep. 17, 1996

[54] GOLF BAG AND ACCESSORY CRADLE

[76] Inventor: Alexis M. Cowe, 911 Camino Corrida, Tucson, Ariz. 85737

[21] Appl. No.: 247,574

[22] Filed: May 23, 1994

[51] Int. Cl.$^6$ .................................................. F16M 11/38
[52] U.S. Cl. ........................ 248/172; 248/670; 211/175; 211/189; 224/539
[58] Field of Search ............................. 224/42.32, 274, 224/42.42, 42.45 R, 919, 539, 542, 547, 550, 551; 248/96, 97, 172, 670, 671, 672, 676, 520, 205.3, 146, 149, 150; 211/175, 70.2, 201, 133, 189; 280/638, 639, 38

[56] References Cited

U.S. PATENT DOCUMENTS

| | | | |
|---|---|---|---|
| 750,174 | 1/1904 | Denise et al. | 248/97 |
| 849,290 | 4/1907 | Vanderbilt . | |
| 855,219 | 5/1907 | Anthony, Jr. | 248/172 |
| 1,061,431 | 5/1913 | West | 224/42.45 R |
| 1,561,122 | 11/1925 | Stahl | 280/35 |
| 2,007,709 | 7/1935 | Eppens . | |
| 2,805,776 | 9/1957 | Levitin | 248/172 |
| 2,842,268 | 7/1958 | Gumplo | 211/175 |
| 3,100,653 | 8/1963 | Ibaugh et al. | 280/638 |
| 3,937,485 | 2/1976 | Shourek et al. | 280/35 |
| 4,061,257 | 12/1977 | St. Clair | 211/70.2 |
| 4,175,666 | 11/1979 | Smith . | |
| 4,355,746 | 10/1982 | Casady . | |
| 4,533,013 | 8/1985 | Hightower | 224/274 |
| 4,541,597 | 9/1985 | Davanture | 248/172 |
| 4,693,402 | 9/1987 | Comeau | 224/919 |
| 4,804,162 | 2/1989 | Rice | 248/671 |
| 4,913,460 | 4/1990 | Klein | 224/274 |
| 5,044,505 | 9/1991 | Spratt | 211/189 |
| 5,088,635 | 2/1992 | Taylor et al. . | |
| 5,104,170 | 4/1992 | Rich . | |
| 5,161,700 | 11/1992 | Stannis et al. | 224/42.42 |

FOREIGN PATENT DOCUMENTS

| | | | |
|---|---|---|---|
| 1452662 | 10/1976 | European Pat. Off. | 248/172 |
| 1458509 | 12/1976 | United Kingdom | 248/172 |

OTHER PUBLICATIONS

Union Special; 1991, pg. 30 Catolog No. 283.

Primary Examiner—Henry J. Recla
Assistant Examiner—Gregory M. Vidovich
Attorney, Agent, or Firm—Antonio R. Durando

[57] ABSTRACT

A golf-bag cradle that consists of two rounded end brackets spaced several feet apart and conforming to the shape of a golf bag, so that the bag may be laid to rest between them. Each bracket is attached to a vertical support anchored to a common base with horizontal transverse extensions to provide stability in the trunk of a vehicle. The vertical supports may be vertically extendable to adjust the height of the brackets, and the base may be horizontally extendable to adjust the distance between the vertical supports, such that different-size bags may be accommodated. In another embodiment, the cradle comprises two sets of brackets stacked vertically to stow two golf bags. Finally, a side pocket may be provided with compartments for storing golf shoes, balls, and other articles of interest.

12 Claims, 2 Drawing Sheets

GOLF BAG AND ACCESSORY CRADLE

BACKGROUND OF THE INVENTION

1. Field of the Invention

This invention is related in general to support frames and racks for golf bags. In particular, it describes a cradle specifically designed for supporting one or more golf bags and other golfing accessories in an automobile trunk.

2. Description of the Related Art

Golf enthusiasts typically carry their clubs in the trunk of their cars for easy access at any time the opportunity arises for play or practice. Because of their size and bulkiness, golf bags tend to occupy most of the free space in an automobile trunk and unavoidably become entangled with other articles stored in it. Unless carefully positioned when placed among other articles in the trunk, the golf bag soon becomes entangled with all sorts of items laying underneath and on top of it, which is very undesirable for a user aspiring to order and organization. This condition complicates the process of retrieving the bag from the trunk, as well as the process of placing it back among the loose items after use.

Another undesirable result of a disorganized trunk is the fact that the bag and the clubs stored in it tend to lay at a angle unevenly supported along their length, which produces stresses that may bend or otherwise damage the clubs. In addition, because some car trunks are very deep and/or low with respect to the ground, the process of removing a golf bag requires a substantial amount of lifting, which can be very burdensome, or even impossible, for some people. Therefore, it would also be useful to have a device for storing the bag in an elevated, more accessible position. This invention is directed at providing a golf-bag support cradle that overcomes these problems of use in the trunk of a motor vehicle.

The prior art illustrates several devices for holding golf bags, but none are suitable for the purposes described. For example, in U.S. Pat. No. 2,007,709 (1933), Eppens describes a golf-bag support consisting of a brace mounted around the mouth of the bag and comprising hinged support members to keep the bag in a tilted position. The purpose of the invention is to keep the clubs off the ground, so as to avoid contact with grass and dirt.

U.S. Pat. No. 5,088,635 to Taylor et al. (1992) discloses a golf-bag rack designed for use as an accessory to a golf cart. The invention has features peculiar to this use which would not be applicable to support a bag in a car.

Another golf-bag holder for golf carts is shown in U.S. Pat. No. 4,355,746 (1982) to Casady. This is a complicated piece of hardware for holding multiple bags in a cart and is also not adaptable for use in a car.

Finally, U.S. Pat. No. 5,104,170 to Rich (1992) is directed at an automobile jack that includes a cradle-type support for storage in the trunk of the vehicle. This device could also not be used for the purposes of this disclosure.

Inasmuch as none of these inventions is suitable for use in a car, there remains a need for a support structure specifically designed to solve the problems herein described. This invention provides a simple solution of universal application.

BRIEF SUMMARY OF THE INVENTION

The primary objective of this invention is a golf-bag cradle that makes it possible to support a golf bag uniformly in an automobile trunk.

Another goal of the invention is a cradle that holds a golf bag in an elevated position above other articles in the trunk.

Still another goal is a cradle that supports a golf bag in a substantially horizontal position.

Another objective is a golf-bag cradle that is stably anchored within the trunk of a car, so as to withstand normal-driving acceleration, deceleration and centrifugal forces that tend to tip it over.

Another objective of the invention is a cradle that is adjustable in height for positioning a golf bag at the right elevation for a user to lift without excessive effort and, possibly, avoiding leaning forward to reach the bag.

Yet another objective is a cradle that is adjustable in width for accommodating bags of different lengths.

A final objective is the realization of the above mentioned goals in an economical and commercially viable manner. This is done by utilizing simple components that are either already available commercially or that can be produced at competitive prices.

Therefore, according to these and other objectives, the present invention consists of two rounded end brackets spaced several feet apart and conforming to the shape of a golf bag, so that the bag may be laid to rest between them. Each bracket is attached to a vertical support anchored to a common base with horizontal transverse extensions to provide stability in the trunk of a vehicle. The vertical supports may be vertically extendable to adjust the height of the brackets, and the base may be horizontally extendable to adjust the distance between the vertical supports, such that different-size bags may be accommodated. In another embodiment, the invention comprises two sets of brackets stacked vertically to stow two golf bags. Finally, a side pocket may be provided with compartments for storing golf shoes, balls, and other articles of interest.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiments and particularly pointed out in the claims. However, such drawings and description disclose but one of the various ways in which the invention may be practiced.

DESCRIPTION OF THE PREFERRED EMBODIMENTS OF THE INVENTION

The present invention consists of a support structure designed to securely hold a golf bag in a horizontal elevated position in the trunk of a car. The various members of the structure are combined to hold at least one bag in place, to provide horizontal adjustments to fit different-size bags, to vary the vertical position of the bag, and to widen the base of the structure in order to vary its stability as needed.

Figure 1:
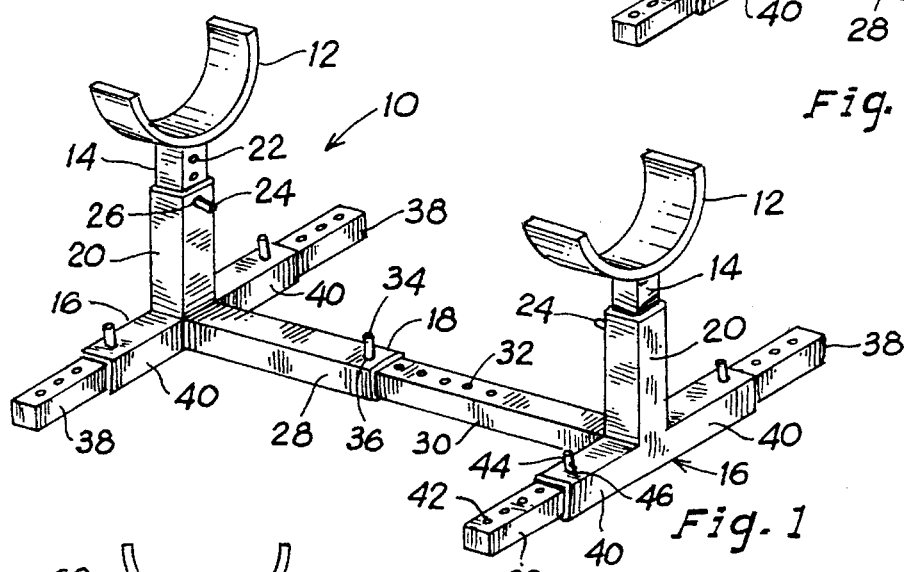
FIG. 1 is a perspective illustration of a golf-bag cradle according to the preferred embodiment of the present invention.

Referring to the drawings, wherein like parts are designated throughout with like numerals and symbols, FIG. 1 illustrates in perspective view a golf-bag cradle 10 according to this invention. It comprises two brackets 12, each independently mounted on a vertical support 14 rigidly attached to a transverse horizontal base 16 adapted to provide stable lateral support to the cradle. Each bracket 12 is shaped to conform to the contour of a typical golf bag, normally substantially circular in cross-section. Therefore, the brackets 12 are preferably concave with a semicircular cross-section that is suitable for housing a variety of sizes and shapes of golf bags. The bases 16 on each side of the cradle are connected by means of a rigid longitudinal brace 18, so as to form a solid structure for supporting a heavy golf bag held within the brackets 12. All of these parts of the cradle may constitute an integral structure, but the preferred embodiment of the invention consists of extendible components to provide means for adjustment in all direction.

Accordingly, each vertical support 14 is preferably connected to its corresponding base 16 by means of a telescopic coupling with a rigid vertical sleeve 20 extending upward from the base. A means for locking the support 14 at a desired extended position within the sleeve 20 must also be provided, such as the combination of a plurality of peg holes 22 in the support 14 and a peg 24 adapted for insertion through a receiving guide hole 26 in the sleeve, such that the extension of the support 14 may be adjusted to the desired length.

Similarly, the longitudinal brace 18 preferably consists of two separate pieces connected telescopically to allow adjustments to the length of the cradle. This feature can be used in order to accommodate different-length golf bags or to change the distribution of the weight of a bag over the brackets, as one might wish to do periodically to vary the load on golf clubs stored in the bag. As above, a telescopic connection is easily accomplished by having the brace 18 consist of two separate components, an outer sheath 28 and an inner shaft 30, each rigidly attached to a base 16 and slidably connected to one another. A plurality of peg holes 22 along the length of the inner shaft 30 and a peg 32, adapted for engagement of the peg holes through a guide slot 36 in the sheath 28, are also provided to lock the brace 18 at the desired length.

Finally, in order to vary the stability of the cradle 10 to match the requirements of its height and load, the transverse legs 40 of each base 16 are preferably also made extendible. Feet 38 are slidably mounted in each leg 40 of the bases, so that the lateral extension of the bases, and therefore the corresponding stability derived therefrom, may be changed as necessary. Again, a combination of a plurality of peg holes 42, a peg 44 and a guide slot 46, or other equivalent locking means, may be provided to secure the position of each foot 38 after adjustment.

In use, the cradle 10 of FIG. 1 can be adjusted to fit the size of the golf bag and of the vehicle trunk for which it is intended. The length of the longitudinal brace 18 is first set to match the size of the golf bag; then, the height of the vertical supports 14 is adjusted to conform to the size of the trunk and to clear any loose articles in it that may hinder the placement of the bag on the brackets 12. Finally, the feet 38 may be extended as allowed within the constraints of the trunk and as necessary for the cradle's stability during motion.

Figure 2:
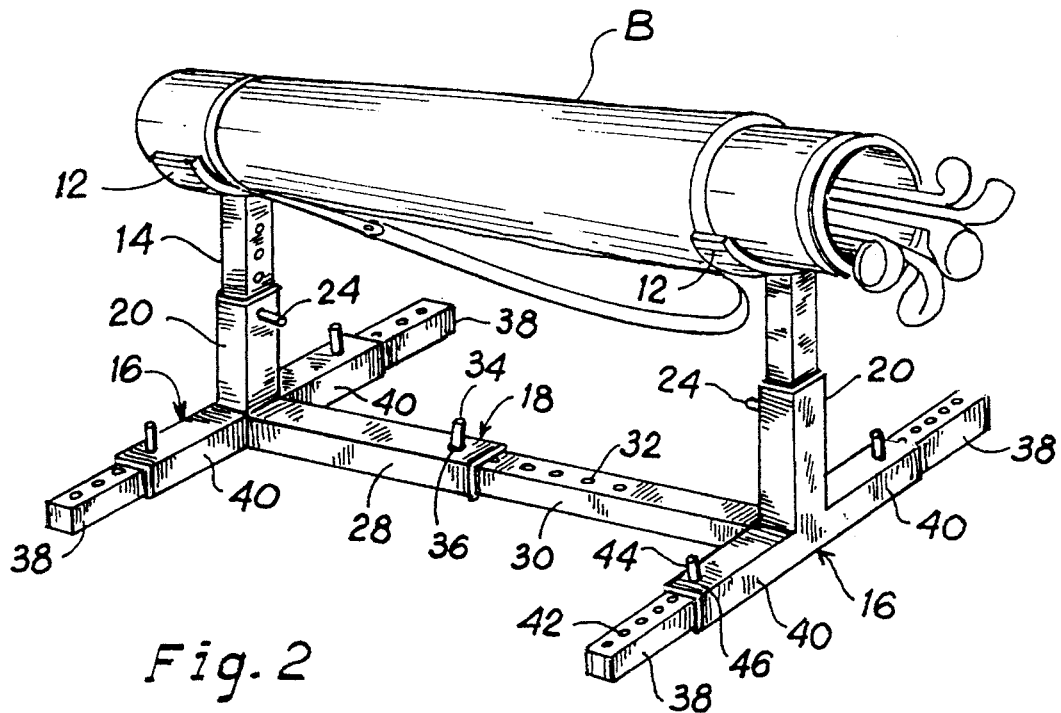
FIG. 2 is an illustration of the cradle of FIG. 1 with a golf bag placed on it.

FIG. 2 illustrates in elevational view a golf bag B placed on the cradle 10 of the invention. It is readily apparent that the cradle may also be used in a stationary location, such as a garage or storage shed, to stow away a golf bag or any other article that needs support. Obviously, because of the independent adjustment afforded each side of the cradle, an article could be stored in a tilted position, if so desired.

Figure 3:
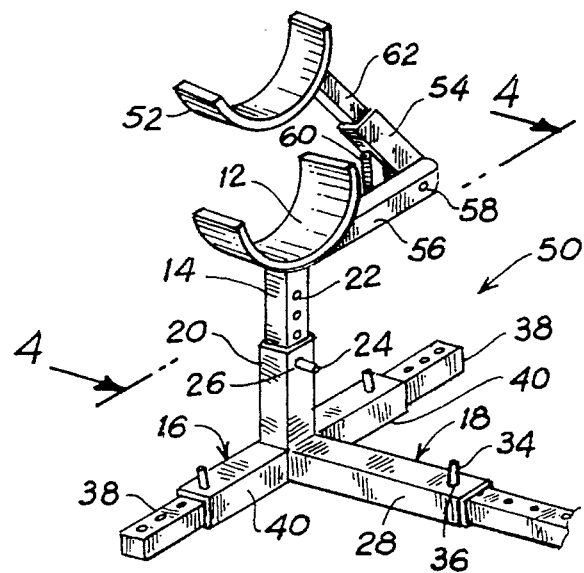
FIG. 3 is a perspective partial view of a golf-bag cradle according to another embodiment of the present invention designed for stowing two vertically-stacked golf bags.
Figure 4:
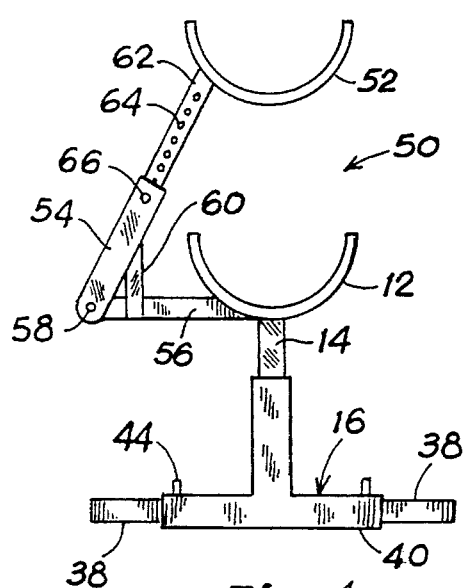
FIG. 4 is a side view of the embodiment shown in FIG. 3 as seen from line 4—4 in that figure.
Figure 5:
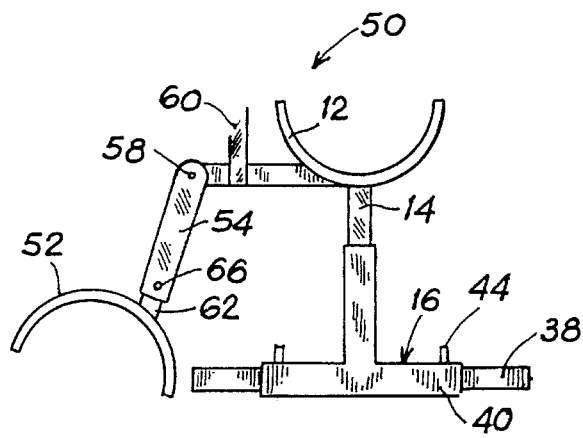
FIG. 5 is a side view of the embodiment of FIG. 3 wherein the upper bracket is shown in retracted position.

In another embodiment 50 of the invention, shown in the partial perspective view of FIG. 3, a second set of upper brackets 52 is combined with the lower brackets 12 to form a second tier for storing another golf bag stacked on top of the first one. Each upper bracket 52 is preferably adapted for retraction out of the way of access to the lower bracket 12 in order to allow the unencumbered use of the lower brackets. This may be achieved, for example, by mounting each upper brackets 52 on a swivel arm 54 pivotally connected to a horizontal support arm 56 fixedly attached to the vertical support 14 of the lower bracket 12, as clearly seen in the side view of FIG. 4. A hinge 58 allows the rotation of the swivel arm 54, so that it may be swung backwards in the direction of arrow A to clear access to the lower brackets. Thus, a first golf bag may be placed on them and then the swivel arm 54 may be swung back to rest against an apposite stop 60 preferably adapted to stop each upper bracket 52 substantially in vertical alignment wit the corresponding lower bracket. Again, each swivel arm 54 may comprise a telescopically-coupled extension arm 62 for adjustment of the height and position of each upper bracket, so that more or less clearance may be produced underneath, as needed. A system of peg holes 64 and a peg 66, or equivalent locking means, would again be needed to secure the length of the swivel arm after adjustment. As illustrated in FIG. 5, the set of upper brackets 52 can be retracted all the way behind the cradle when not in use.

Figure 6:
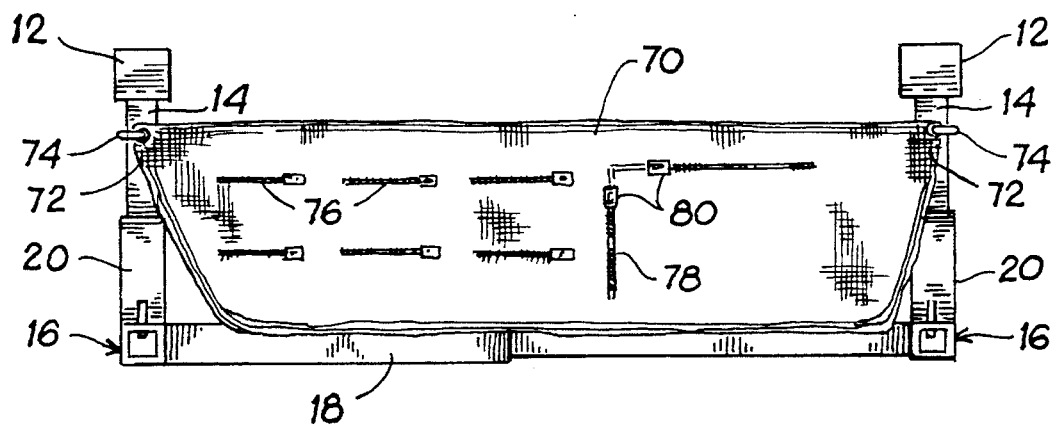
FIG. 6 is an elevational front view of the embodiment of FIG. 1 combined with a storage compartment mounted on the structure of the cradle.

Finally, the structure of the invention may be utilized to also support a storage compartment for various other golfing items that normally accompany a golf bag, such ar shoes, brushes, rags, etcetera. Thus, as illustrated in the elevational view of FIG. 6, a storage compartment 70, preferably made with flexible material, is attached to the frame of the cradle 10 by some retaining means, such as grommets 72 incorporated in the material and engaged by hooks 74 in the frame of the cradle. Various pockets 76 and larger storage cells 78, preferably secured by zippers 80 or Velcro $^R$ fasteners, may be provided as best suited to store articles of interest to typical golfers.

It is expected that the preferred embodiment of the invention would be manufactured in plastic material for light weight and ease of construction. Each bracket in the cradle would preferably be covered with a layer of protective material to avoid scuffing of the golf bag; and rubberized components may be installed under each base 16 to prevent sliding of the cradle.

Various changes in the details, steps and materials that have been described may be made by those skilled in the art within the principles and scope of the invention herein illustrated and defined in the appended claims. For example, square, rectangular or circular tubing may be used in the construction of all telescopically-coupled members in the telescopic configuration of the cradle. Each component could be manufactured or coated with anti-friction material to facilitate their sliding during extension and retraction. Moreover, the invention is described as a cradle for a conventional golf bag, but the same functional principles can be applied to support any other item in a car trunk or in a stationary storage situation. Accordingly, multiple sets of brackets could be stacked vertically as shown herein; also, each set of brackets could comprise more than two brackets for greater horizontal support or, at the limit, it could consist of a single channel-like bracket placed longitudinally over the base. Similarly, as one skilled in the art would readily recognize, the brackets and the base of the cradle could be connected by a single vertical support 14 attached to a brace rigidly connecting the brackets and disposed in balanced configuration with respect to the base. Therefore, while the present invention has been shown and described herein in what is believed to be the most practical and preferred embodiment, it is recognized that departures can be made therefrom within the scope of the invention, which is therefore not to be limited to the details disclosed herein but is to be accorded the full scope of the claims so as to embrace any and all equivalent apparatus and methods.

I claim:

1. A cradle for holding a golf bag in an elevated, substantially horizontal position over a supporting surface, comprising:

(a) a horizontal base consisting of two horizontal transverse members rigidly and transversely connected by a horizontal longitudinal brace therebetween, said transverse members having a flat underside adapted to be in frictional contact with said support surface;

(b) a pair of vertical support members extending from said horizontal base;

(c) a bracket rigidly connected to each of said pair of vertical support members, each said bracket consisting of an upward-rounded channel section disposed in longitudinal alignment with the other bracket and with said horizontal longitudinal brace sized to receive and securely hold in place a cross-section of a golf bag therein; and (d) a storage compartment releasably attached to said cradle and including means for stowing golf accessories.

2. The cradle recited in claim 1, further comprising extension means for adjusting a length of each of said pair of vertical support members.

3. A cradle for holding two golf bags in an elevated, substantially horizontal position on a supporting surface, comprising:

(a) a horizontal base consisting of two horizontal transverse members rigidly and transversely connected by a horizontal longitudinal brace therebetween;

(b) a vertical support member extending from each of said transverse members;

(c) a lower bracket attached to each vertical support member, each lower bracket consisting of an upward-rounded channel section in disposed in longitudinal alignment with the other lower bracket and with said horizontal longitudinal brace sized to receive and securely hold in place a cross-section of a of a golf bag therein;

(d) a lateral support arm connected to each vertical support member; and (e) an upper bracket attached to each lateral support arm, each upper bracket consisting of an upward-rounded channel section disposed in longitudinal alignment with the other upper bracket and with said horizontal longitudinal brace sized to receive and securely hold in place a cross-section of another golf bag therein.

4. A cradle for holding golf bags in an elevated, substantially horizontal position, comprising:

(a) a horizontal base consisting of two horizontal transverse members rigidly and transversely connected by a horizontal longitudinal brace therebetween;

(b) a pair of vertical support members extending from said base, each vertical support member being rigidly connected to a respective lower bracket adapted for receiving and securely holding in place a portion of a golf bag thereon; and (c) a support arm connected to each of said pair of vertical support members, each support arm being rigidly attached to a respective upper bracket adapted for receiving and securely holding in place a portion of another golf bag thereon;

wherein each of said support arms is connected to said respective upper bracket through a swivel arm rigidly attached to said upper bracket and pivotally coupled to said support arm.

5. The cradle recited in claim 4, further comprising vertical extension means for adjusting a length of each of said pair of vertical support members.

6. The cradle recited in claim 4, further comprising longitudinal extension means for adjusting a length of said horizontal longitudinal brace.

7. The cradle recited in claim 4, wherein each of said horizontal transverse members further comprises transverse extension means for adjusting a length of each of said horizontal transverse members.

8. The cradle recited in claim 4, further comprising vertical extension means for adjusting a length of each of said pair of vertical support members, comprising longitudinal extension means for adjusting a length of said horizontal longitudinal brace, and comprising transverse extension means for adjusting a length of each of said horizontal transverse members, wherein each of said vertical extension means, said longitudinal extension means and said transverse extension means consists of a telescopic connection between an outer sleeve and an inner shaft slidably coupled thereto.

9. The cradle recited in claim 8, further comprising locking means for securing the position of each of said telescopic connections after adjustment to a predetermined length.

10. The cradle recited in claim 4, further comprising a storage compartment attached to said cradle.

11. The cradle recited in claim 4, further comprising swivel extension means for adjusting a length of said swivel arm.

12. The cradle recited in claim 11, further comprising locking means for securing the position of said swivel arm after adjustment to a predetermined length.

* * * * *

UNITED STATES PATENT AND TRADEMARK OFFICE
CERTIFICATE OF CORRECTION

PATENT NO. : 5,556,064
DATED : September 17, 1996
INVENTOR(S) : Alexis M. Cowe

It is certified that error appears in the above-indentified patent and that said Letters Patent is hereby corrected as shown below:

Column 5;
In Claim 3(c), line 53, delete --in-- after "section"

Signed and Sealed this

Nineteenth Day of November, 1996

Attest:

BRUCE LEHMAN

Attesting Officer

Commissioner of Patents and Trademarks